US011206287B2

(12) United States Patent
Pal et al.

(10) Patent No.: US 11,206,287 B2
(45) Date of Patent: Dec. 21, 2021

(54) EVALUATING CYBER-RISK IN SYNCHROPHASOR SYSTEMS

(71) Applicant: Battelle Memorial Institute, Richland, WA (US)

(72) Inventors: Seemita Pal, Richland, WA (US); Arun Veeramany, Richland, WA (US); Christopher A. Bonebrake, West Richland, WA (US); Beverly E. Johnson, Richland, WA (US); William James Hutton, III, Benton City, WA (US); Siddharth Sridhar, Seattle, WA (US); Sri Nikhil Gupta Gourisetti, Richland, WA (US); Garill A. Coles, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 249 days.

(21) Appl. No.: 16/261,283

(22) Filed: Jan. 29, 2019

(65) Prior Publication Data

US 2020/0244698 A1    Jul. 30, 2020

(51) Int. Cl.
*H04L 29/06* (2006.01)

(52) U.S. Cl.
CPC ...... *H04L 63/1466* (2013.01); *H04L 63/1433* (2013.01)

(58) Field of Classification Search
CPC ................ H04L 63/1466; H04L 63/1433
See application file for complete search history.

(56) References Cited

U.S. PATENT DOCUMENTS

| 9,092,631 | B2 | 7/2015 | Mullet et al. | |
|---|---|---|---|---|
| 10,749,890 | B1 * | 8/2020 | Aloisio | G06N 5/003 |
| 2011/0282508 | A1 * | 11/2011 | Goutard | H04L 63/20 |
| | | | | 700/293 |
| 2011/0288692 | A1 * | 11/2011 | Scott | G06F 21/55 |
| | | | | 700/297 |
| 2012/0010830 | A1 * | 1/2012 | Saarinen | G01R 31/3274 |
| | | | | 702/58 |

(Continued)

FOREIGN PATENT DOCUMENTS

WO    WO-2019224539 A1 * 11/2019 ........ H02J 13/00002

OTHER PUBLICATIONS

L. Langer, P. Smith, M. Hutle and A. Schaeffer-Filho, "Analysing cyber-physical attacks to a Smart Grid: A voltage control use case," 2016 Power Systems Computation Conference (PSCC), Genoa, 2016, pp. 1-7, doi: 10.1109/PSCC.2016.7540819. (Year: 2016).*

(Continued)

*Primary Examiner* — Vance M Little
(74) *Attorney, Agent, or Firm* — Klarquist Sparkman, LLP

(57) ABSTRACT

Technology related to evaluating cyber-risk for synchrophasor systems is disclosed. In one example of the disclosed technology, a method includes generating an event tree model of a timing-attack on a synchrophasor system architecture. The event tree model can be based on locations and types of timing-attacks, an attack likelihood, vulnerabilities and detectability along a scenario path, and consequences of the timing-attack. A cyber-risk score of the synchrophasor system architecture can be determined using the event tree model. The synchrophasor system architecture can be adapted in response to the cyber-risk score.

25 Claims, 9 Drawing Sheets

(56) References Cited

U.S. PATENT DOCUMENTS

| | | | |
|---|---|---|---|
| 2014/0137257 A1* | 5/2014 | Martinez | H04L 63/1433 726/25 |
| 2015/0039148 A1* | 2/2015 | Bhageria | G01R 21/003 700/292 |
| 2015/0262064 A1* | 9/2015 | Burger | G06F 16/9027 706/46 |
| 2015/0281278 A1* | 10/2015 | Gooding | H04L 63/14 726/1 |
| 2016/0223677 A1* | 8/2016 | Trevino | H04K 3/90 |
| 2016/0253495 A1* | 9/2016 | Kolacinski | G06F 21/55 726/23 |
| 2016/0267408 A1* | 9/2016 | Singh | G06N 7/005 |
| 2016/0315774 A1* | 10/2016 | Faruque | H04W 12/001 |
| 2017/0093889 A1* | 3/2017 | McEachern | H04L 63/1441 |
| 2018/0004948 A1* | 1/2018 | Martin | G06F 21/552 |
| 2018/0176249 A1* | 6/2018 | Hong | H04L 63/1416 |

OTHER PUBLICATIONS

Byers, David, et al., Modeling Software Vulnerabilities With Vulnerability Cause Graphs, 22nd IEEE Int'l Conf. on Software Maintenance, 2006 (Year: 2006).*

Noel, Steven, et al., Measuring Security Risk of Networks Using Attack Graphs, Int'l Journal of Next-Generation Computing, vol. 1, No. 1, Jul. 2010 (Year: 2010).*

Smith (editor), Hutle, and Hansch, et al., SPARKS (Smart Grid Protection Against Cyber Attacks) Contract No. 608223, D2.2 Threat and Risk Assessment Methodology, Sep. 31, 2015. (Year: 2013).*

Singh, Vivek Kumar, et. al., Decision Tree Based Anomaly Detection for Remedial Action Scheme in Smart Grid using PMU Data, Iowa State. Univ., Dept. Elect. And Comp. Eng., IEEE, 2018. (Year: 2018).*

Ten, Chee-Wooi and Chen-Ching Liu, Vulnerability Assessment of Cybersecurity for SCADA Systems Using Attack Trees, Pub. IEEE Xplore, 2007. (Year: 2007).*

Berg, Andrew Michael, Synchrophasor Technology and Applications: Benefits Over Conventional Measurements, Thesis and Dissertation, Univ. of N. Dakota, Jan. 2015. (Year: 2015).*

Deng, Yi and Sandeep Shukla, Vulnerabilities andCountermeasures—A Survey on the Cyber Security Issues in the Transmission Subsystem of a Smart Grid, Dept. of ECE, Va. Tech. Jour. Cyber Sec. and Mobility, vol. 1, 251-276, 2012. (Year: 2012).*

Pan, Shengyi, Classification of Disturbances and Cyber-Attacks in Power System Using Heterogeneous Time-Synchronized Data, IEEE Transactions on Industrial Informatics, vol. 11, No. 3, Jun. 2015. (Year: 2015).*

Sen, Dev K., et al., Rapid Development of an Event Tree Modeling Tool Using COTS Software, IEEE, 2006 (Year: 2006).*

"Common Vulnerability Scoring System v3.0: User Guide," *First. Org, Inc.*, Retrieved from: https://www.first.org/cvss/cvss-v30-user_guide_v1.5.pdf, 15pp. (Last accessed Jan. 23, 2019).

Yan et al., "A PMU-based Risk Assessment Framework for Power Control Systems," *2013 IEEE Power & Energy Society General Meeting*, Vancouver, BC, pp. 1-5 (2013).

\* cited by examiner

| Attack Target | Attack Type | Potential Consequence | Potential Impact |
|---|---|---|---|
| GPS signal | Jamming | GPS receiver correctly outputs status of loss of synchronization and relies on holdover time (IRIG-B) | Holdover time |
| | | GPS receiver outputs status of poor time quality (IRIG-B) | Missing data (data dropped at PMU) |
| | Spoofing or meaconing | GPS receiver detects altered time and correctly reports status of poor time quality (IRIG-B, pps) | Missing data (data dropped at PMU) |
| | | GPS receiver detects altered time and utilizes holdover time (pps) | Holdover data |
| | | GPS receiver doesn't detect altered signal and continues to send time as good (IRIG-B, pps) | Corrupted data |
| PMU | Time stamp deletion | Missing time-stamp corresponding to generated measurement | Missing data (data dropped at PMU/PDC) |
| | Time stamp modification | Incorrect time-stamp corresponding to generated measurement | Corrupted data |
| PDC | Time stamp deletion | Missing time-stamps corresponding to measurements being aggregated | Missing data (data dropped at PDC) |
| | Time stamp modification | Incorrect time-stamp corresponding to measurement being aggregated | Corrupted data |
| Network Device | Time stamp deletion | Missing time-stamp corresponding to measurement | Missing data (data dropped at PDC) |
| | Time stamp modification | Incorrect time-stamp corresponding to measurement | Corrupted data |

320

| SEQ NAME | Initiating Location | Vulnerability (1) | Detection Probability (2) | Consequence (3) | Risk Score $1.0*(1)(2)(3)$ |
|---|---|---|---|---|---|
| TIM_1 | PDC | 1 | 1 | 2 | 2 |
| TIM_2 | PDC | 1 | $p$ | 2 | $2p$ |
| TIM_3 | PDC | 1 | $(1-p)$ | 3 | $3(1-p)$ |
| TIM_4 | NETWORK | 2 | 1 | 2 | 4 |
| TIM_5 | NETWORK | 2 | $p$ | 2 | $4p$ |
| TIM_6 | NETWORK | 2 | $(1-p)$ | 3 | $6(1-p)$ |
| TIM_7 | PMU | 1 | 1 | 2 | 2 |
| TIM_8 | PMU | 1 | $p$ | 3 | $3p$ |
| TIM_9 | PMU | 1 | $(1-p)$ | 2 | $2(1-p)$ |
| TIM_10 | ANT | 3 | $q1$ | 1 | $3q1$ |
| TIM_11 | ANT | 3 | $q2$ | 2 | $6q2$ |
| TIM_12 | ANT | 3 | $(1-q1-q2)p$ | 2 | $6(1-q1-q2)p$ |
| TIM_13 | ANT | 3 | $(1-q1-q2)(1-p)$ | 3 | $9(1-q1-q2)(1-p)$ |
| TIM_14 | ANT | 3 | $q$ | 1 | $3q$ |
| TIM_15 | ANT | 3 | $(1-q)$ | 2 | $6(1-q)$ |

EVALUATING CYBER-RISK IN SYNCHROPHASOR SYSTEMS

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

Synchrophasor technology can include time-synchronized monitoring of electrical systems at a high speed and over a wide area. For example, synchrophasor technology can be used as an element of a power grid or electrical transmission system. Measurements captured with synchrophasor measurement devices can be used to monitor and/or control devices within the power grid or electrical transmission system. An adversary may attempt to exploit vulnerabilities within cyber infrastructure of the synchrophasor system in order to damage or disrupt the synchrophasor system. Accordingly, there is ample opportunity to evaluate cyber-risk and/or to reduce cyber-risk associated with the synchrophasor system.

BRIEF DESCRIPTION OF THE DRAWINGS

FIG. 3 illustrates an example of potential consequences and risk scores of various cyber-attacks of a synchrophasor system.

DETAILED DESCRIPTION

General Considerations

Figure 1:
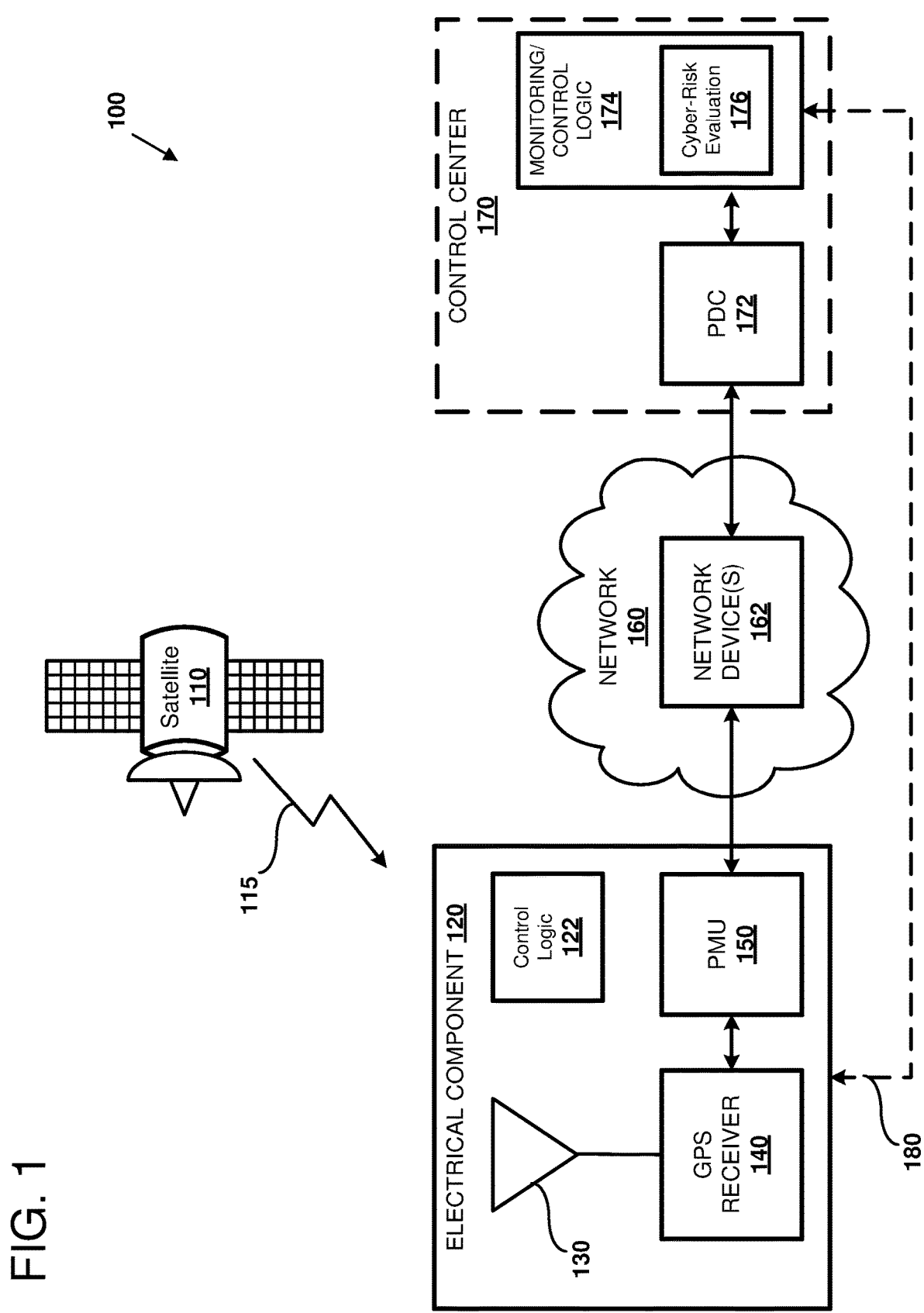
FIG. 1 is a system diagram showing an example of a power system including a synchrophasor system.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood to one of ordinary skill in the relevant art having the benefit of the present disclosure that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Overview

Synchrophasor technology can enable time-synchronized monitoring of electrical components at a high speed and over a wide area. Measurements captured with synchrophasor measurement devices can be used to monitor and/or control the electrical components of a synchrophasor system. The measurements can include voltage, current, frequency, phase angle, and/or a rate of change of voltage, current, or frequency, for example. The measurements are synchronized in time. For example, each measurement can include an associated time-stamp that indicates the time when the measurement was taken. The synchronization can occur by using timing information from a common time source, such as a Global Positioning System (GPS) reference source.

Generally, a cyber domain (also referred to as cyber infrastructure or cyberspace) is an information environment that includes interdependent networks of information technology (IT) infrastructures and resident data. The cyber domain can include users or persona of the IT infrastructure, devices and software of the IT infrastructure, logic used by the devices and software systems, transmission paths for logic to flow through the IT infrastructure, and geographic locations of the transmission paths, physical systems, and users. The cyber domain can include the Internet, telecommunications networks, computer systems, and embedded processors and controllers.

A cyber infrastructure can be used to interconnect the different components of a synchrophasor system. An adversary may attempt to exploit vulnerabilities within cyber infrastructure of the synchrophasor system in order to damage or disrupt the synchrophasor system. Vulnerabilities can occur at the persona, device, logic, transmission, or geographic aspects of the cyber infrastructure. Accordingly, a synchrophasor system provider may desire to evaluate cyber-risk and/or to reduce cyber-risk associated with the synchrophasor system. Cyber-risk can be quantified as the possibility or probability of a cyber-event where an occurrence may cause a negative impact to the IT or electrical infrastructure, information systems, networks, or data. A risk model can be used toward identifying, estimating and prioritizing risk to the system operations, assets, individuals or other dependent systems of the synchrophasor system.

Specifically, a risk model can be used to quantify the direct impacts on phasor measurement data, as well as end applications (e.g. a fault location application), due to a violation of availability or integrity of timing information. The risk model can utilize an event tree analysis (ETA) technique to develop a semi-quantitative approach for modeling cyber-risks. The risk model can capture a vulnerability of the components of the synchrophasor system to timing attacks, and the impact of such timing attacks on Phasor Measurement Unit (PMU) data which can be used as input data for various power system applications. Numerical scores can be assigned to the vulnerabilities and the impacts based on their severity. For each scenario, a threat likelihood, vulnerability score, impact score, and detection probability can be aggregated to estimate a final risk score. The risk model can be used to determine the risks based on the relevant threats, vulnerabilities and potential impacts. This output from the risk model can be used to allocate resources and/or determine appropriate security controls aimed at detecting and/or reducing a likelihood of timing intrusion attacks of the synchrophasor system, making the synchrophasor system more secure and less susceptible to disruption. Additionally, the output from the risk model can be used in real-time to protect the synchrophasor system from cyber-attacks.

Example Architectures and Methods for Evaluating Cyber-Risk in Synchrophasor Systems FIG. 1 is a system diagram showing an example of a power system including a synchrophasor system 100 having components in a physical domain and in a cyber domain. The synchrophasor system 100 can include one or more electrical components 120 in communication with a control center 170.

The electrical components 120 can include renewable or nonrenewable electrical generators, transmission lines, transformers, relays, and other components that can be used within an electrical generation and transmission system. Inputs and/or outputs of the electrical components 120 can be measured by a phasor measurement unit (PMU) 150. The PMU 150 is a device that can be used to measure or estimate a magnitude and/or phase angle of an electrical quantity such as voltage or current using a common time source for synchronization. By using a common time source, the measurements of a given component can be synchronized for the component and across different components. Thus, a synchronized measurement of the system can be taken across all of the components of the system. One method for synchronizing the measurements is by using a Global Positioning System (GPS) reference source. For example, a GPS satellite 110 can transmit a time synchronization signal 115 which can be received by an antenna 130 connected to a GPS receiver 140. The GPS receiver 140 can communicate the GPS reference signal to the PMU 150 so that the measurements of the PMU 150 can be synchronized with the GPS reference signal. Specifically, the PMU 150 can generate a timestamp based on the GPS reference signal, and the timestamp can be combined with the measurement of the electrical quantity to generate synchrophasor data. The PMU 150 can capture samples of the electrical quantities at a rate of 30, 60, or 90 samples per second, for example. Thus, the input and/or output waveforms can be reconstructed from the measurement with relatively high accuracy.

A synchrophasor measurement device (e.g., PMU 150) can include hardware, software, or a combination of hardware and software. For example, the synchrophasor measurement device can include a processor, a microcontroller, programmable logic (e.g., a field-programmable gate array), hardwired finite state machines, programmable microcode, or other suitable control circuits for measuring an electrical quantity, synchronizing the measurement with a reference time source, and communicating with one or more devices of the synchrophasor system. The synchrophasor measurement device can include circuits for measuring an electrical quantity, such as current, voltage, and/or phase angle. The synchrophasor measurement device can include circuits for communicating over an interconnection network, such as the interconnection network 160. In one example, the synchrophasor measurement device can include a GPS receiver.

The PMU 150 can communicate with a control center 170 or another controller via the interconnection network 160. For example, the interconnection network 160 can be utilized to interconnect various electrical components (including electrical component 120) of the synchrophasor system 100 and the control center 170. The interconnection network 160 can include one or more network devices 162, such as switches, routers, and so forth. The interconnection network 160 can include plain old telephone service (POTS) signal lines, a local-area network (LAN), a wide-area network (WAN), and/or the Internet, for example. As a specific example, the interconnection network 160 can include multiple tiers of network infrastructure using routers and firewalls with site-to-site encryption, but local networks are unencrypted. It should be appreciated that the network topology illustrated for the network 160 has been simplified and that many more networks and networking devices can be utilized to interconnect the various electrical components of the synchrophasor system 100. As illustrated, the network 160 is external to the electrical component 120 and the control center 170. However, the network 160 can include network devices that are integrated with the electrical component 120 and the control center 170.

The control center 170 can include a phasor data concentrator (PDC) 172. The PDC 172 can collect and synchronize synchrophasor data and other information from the various electrical components of the synchrophasor system 100. Specifically, the PDC 172 can collect synchrophasor data from the electrical component 120 and other electrical components of the synchrophasor system 100. The PDC 172 can correlate the data from the various electrical components and pass the correlated data to monitoring and/or control logic 174. The control center 170 can use its own GPS-synchronized time source (not shown) or another time source. The monitoring and/or control logic 174 can include software, hardware, or a combination of hardware and software. For example, the monitoring and/or control logic 174 can be executed on a front-end processor (not shown) that executes one or more applications, such as fault location software, oscillation monitoring software, cyber-risk evaluation software 176, and other software for monitoring and controlling the synchrophasor system 100. The front-end processor can be protected with various physical and network security measures to reduce the likelihood of a successful cyber-attack directed at the front-end processor. The monitoring and/or control logic 174 can generate control signals that are communicated to the electrical component 120 via the network 160 or via a dedicated control path 180. For example, the control signals can be received by the control logic 122 and used to change operating parameters of the electrical component 120 so that the electrical component 120 can be adapted and/or removed from the synchrophasor system 100.

The cyber-risk evaluation software 176 used to identify potential targets within the cyber domain of the synchrophasor system 100. Specifically, the cyber-risk evaluation software 176 can perform a risk analysis to determine which components may be vulnerable to a cyber-attack and what consequences may result from a cyber-attack. As one example, the vulnerabilities can be addressed during a design and/or upgrade phase of the synchrophasor system 100. As another example, the results of the risk analysis can be used in conjunction with the synchrophasor measurements to determine whether a cyber-attack is occurring and whether protective actions can be taken.

One potential target for a cyber-attack of the synchrophasor system 100 is the synchronized timing information that is embedded with the synchrophasor data. A cyber-attacker could potentially exploit vulnerabilities within the synchrophasor system 100 to delete and/or modify the timing information so that the synchrophasor data reports no or corrupt information. The missing and/or corrupt synchrophasor data could potentially cause the monitoring and/or control logic 174 to report erroneous problems within the synchrophasor system 100 and/or to adjust control parameters of the electrical components so that the components are damaged and/or taken out of service. A cyber-attack can attempt to modify the timing information at different points within the synchrophasor system 100. For example, an attacker can try to jam, spoof, or meacon the GPS signal 115. Meaconing includes intercepting and rebroadcasting a navigation signal (such as the GPS signal 115). When the GPS signal is rebroadcast, an attacker can modify the signal with incorrect timing information and rebroadcast the modified signal at the received frequency. By rebroadcasting the modified signal at a higher power than the original signal, the GPS receivers (e.g., GPS receiver 140) of the electrical components may use the information encoded within the modified signal instead of the information encoded within the original signal. Thus, the PMU 150 may receive incorrect timing information which may then be propagated along with the synchrophasor data. Alternatively or additionally, an attacker can attempt to strip out or modify the timing information as it passes through the network 160 or the PDC 172.

As one example, the cyber-risk evaluation software 176 can be used to adapt the synchrophasor system 100 in response to detecting a potential cyber-attack. For example, the cyber-risk evaluation software 176 can receive measurement data from one or more synchrophasor measurement devices (e.g., measurement data from PMU 150 as aggregated by PDC 172). The cyber-risk evaluation software 176 can determine a cyber-risk score of the synchrophasor system 100 using an event tree model of an attack on the synchrophasor system 100 and the received measurement data. For example, the event tree model can be based on locations and types of timing-attacks, an attack likelihood at the location or for the type of timing-attack at the location, vulnerabilities and detectability along a scenario path, and/or consequences of the timing-attack. As described in more detail below, the event tree model can include branch-points (also referred to as nodes) for components of the synchrophasor system 100 and branches or sub-branches for consequences of a timing attack at the particular component. In other words, a particular branch-point of the event tree model can correspond to a particular component of the synchrophasor system 100 and a consequence of a timing attack at the particular component. Potential consequences can include a missing synchronized timestamp from the synchrophasor data, or a modified or corrupt synchronized timestamp from the synchrophasor data, for example. A potential cyber-attack can be detected when the timestamp information is missing or different than expected for a threshold amount of time, for example. Determining the cyber-risk score of the synchrophasor system 100 can include determining a vulnerability score for a respective component of the synchrophasor system. The vulnerability score for the respective component of the synchrophasor system 100 can be based on physical accessibility of the respective component, an attack complexity for exploiting the respective component, and/or a privilege level for accessing the respective component. The synchrophasor system 100 can be adapted by changing an operating parameter of a component of the synchrophasor system 100 based on the cyber-risk score. As one example, changing the operating parameter of the component of the synchrophasor system 100 can include removing the component from the synchrophasor system 100. As another example, changing the operating parameter of the component of the synchrophasor system 100 can include selecting an alternative timing source. In this manner, the cyber-risk evaluation software 176 can be used to protect and/or adapt the synchrophasor system 100 in response to detecting a potential cyber-attack.

Figure 2:
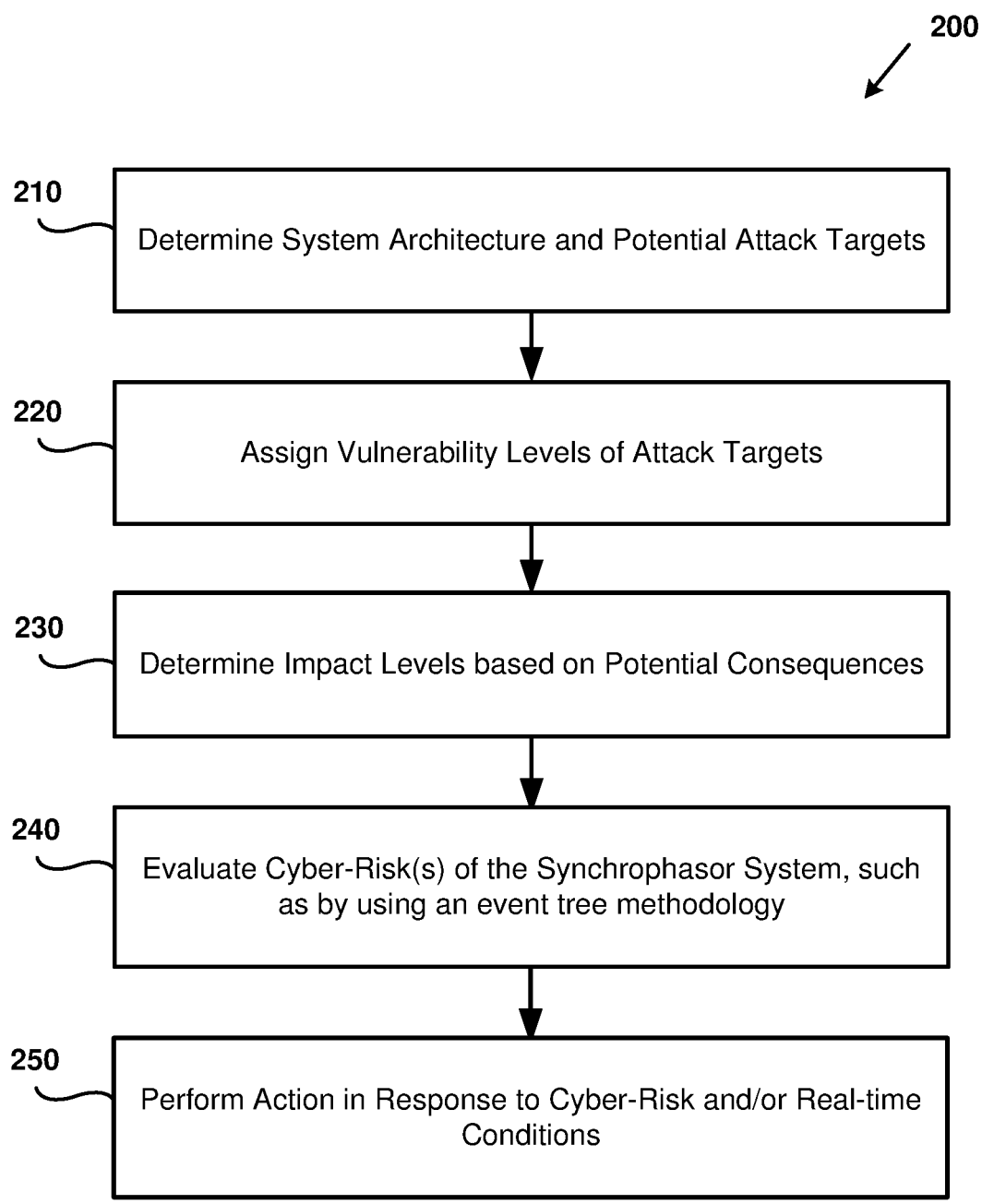
FIG. 2 is a flow diagram of an example method of evaluating and responding to cyber-risk in a synchrophasor system.

FIG. 2 is a flow diagram of an example method 200 of evaluating and responding to cyber-risk in a synchrophasor system. The method 200 can be performed using hardware, software, or a combination of hardware and software. For example, the method 200 can be performed by the monitoring and/or control logic 174 of FIG. 1.

At process block 210, a system architecture of the synchrophasor system and potential attack targets can be determined. An attacker can attempt to exploit targets that are vulnerable to attack, where a vulnerability can be a weakness in the computational logic (e.g., code) found in software and hardware components that, when exploited, results in a negative impact to confidentiality, integrity, or availability of the synchrophasor system. Thus, attack target(s) can be the equipment or components of the infrastructure that are vulnerable to attack by an adversary who may gain access or control over the equipment or components. Using the example from FIG. 1, the attack targets can be the GPS signal 115, the PMU 150, the network device(s) 162 and the PDC 172. In this example, the front-end processor of the control center 170 is not an attack target because it is protected with various physical and network security measures so it is considered low-risk as compared to the other components.

At process block 220, vulnerability levels of the attack targets can be assigned. As one example, the vulnerability levels of the attack targets can be based on a variety of factors, such as physical accessibility of the attack target, an attack complexity for exploiting the attack target, and/or a privilege level for accessing the attack target. A base score can be assigned for each of the factors and an overall vulnerability for the attack target can be determined by combining the base scores for the attack target. For example, the overall vulnerability score for the attack target can be generated by averaging the base scores of the individual factors. Other combinations are possible, such as adding the base scores, taking a weighted average of the base scores (where more important base scores are given a higher weight), and so forth.

The base score for the physical accessibility factor can be based on a remoteness of an attacker relative to the attack target, where greater remoteness of the attack target (in terms of logical and physical distance) lowers the base score. This metric can be used to distinguish between (1) physical attacks which probably require physical access to the attack target in order to exploit a vulnerability (such as attacks on the PDC 172 which is likely to be physically and logically secure within the control center 170); (2) attacks which may require communication network access but probably do not require physical access (such as an attack against the network device 162); and (3) attacks which can occur without access to the communication network or physical access (such as GPS jamming or spoofing attacks where the jammer or spoofer can perform the attack within a certain geographic radius of the victim GPS receiver without accessing the communications network). As one example, a base score of one can be assigned for attacks that can be carried out where physical access to the attack target is probably required; a base score of two can be assigned for attacks that can be carried out where network access is likely sufficient to perform an attack on the attack target; and a base score of three can be assigned for attacks that can be carried out without physical access or network access to the attack target.

Using the example from FIG. 1, the GPS signal 115 can be assigned a base score of three because the signal collected by the GPS receiver is unencrypted, and can be jammed or spoofed without breaching the physical or electronic perimeters of the facility. The PMU 150 and the PDC 172 can be assigned a base score of two. For example, the PMU 150 and the PDC 172 are likely housed within a perimeter of an electrical substation or control center 170, which typically will be protected by physical security, and will be relatively difficult to access physically unless the attacker is an insider. The network devices 162 can be assigned a base score of two because the network devices 162 can potentially be accessed by an adversary via the network 160 by compromising a vulnerable node of the network 160.

The base score for the attack complexity factor can be based on resources (software, hardware, or knowledge) that are potentially required by the attacker in order for the vulnerability to be successfully exploited, where the lower the complexity of resources that may be used to successfully attack the target increases the base score. As one example, a base score of one can be assigned for attacks that probably require expensive resources to successfully attack the target; a base score of two can be assigned for attacks that may be successfully accomplished using commercial off-the-shelf tools and/or a medium level of skills; and a base score of three can be assigned for attacks that may be successfully accomplished using open source tools and/or knowledge.

Using the example from FIG. 1, the GPS signal 115 can be assigned a base score of two because even though GPS jamming and spoofing are illegal in the US, inexpensive commercial-off-the-shelf components may be available which can be integrated, using basic skills, and used to launch attacks on the GPS signal 115. The PMU 150 and the PDC 172 can be assigned a base score of one. For example, the PMU 150 and the PDC 172 are likely to be physically secure inside an electrical substation or control center, protected by firewalls and access control mechanisms (both physical and electronic). Therefore, an attacker may need to invest significant resources to successfully attack the PMU 150 and the PDC 172. The network devices 162 can be assigned a base score of thee because the network devices 162 can potentially be attacked via the network 160 by using open-source information and tools.

The base score for the privilege level factor can be based on a level of access and human interaction that is probably required for a successful attack, where a lower level of privileges needed for a successful attack increases the base score. As one example, a base score of one can be assigned for attacks that probably require elevated privileges (such as administrator privileges); a base score of two can be assigned for attacks that may be successfully accomplished using basic privileges (such as user privileges); and a base score of three can be assigned for attacks that may be successfully accomplished without any privileges.

Using the example from FIG. 1, the GPS signal 115 can be assigned a base score of three because the attacker can jam, spoof, or meacon the signal without any privileges or user interaction. The network devices 162 can be assigned a base score of two because an attacker with user level access may be able to execute a timing attack with or without user interaction. The PMU 150 and the PDC 172 can be assigned a base score of one because in order to successfully execute a timing attack, the attacker probably needs user interaction (e.g., using a phishing attack to cause a user run a malicious executable) for elevating privileges to the administrator level in order to enter the system and infiltrate the attack target.

When the base scores have been assigned for each of the factors, an overall vulnerability for the attack target can be determined by combining the base scores for the attack target. For example, the overall vulnerability score for the attack target can be generated by averaging the base scores of the individual factors. Using the example from FIG. 1, the GPS signal 115 was assigned base scores of three, two, and three for an average of 2.67 (or three if rounding to the nearest integer). The PMU 150 and the PDC 172 were each assigned base scores of two, one, and one for an average of 1.33 (or one if rounding to the nearest integer). The network devices 162 were each assigned base scores of two, one, and one for an average of 1.33 (or one if rounding to the nearest integer).

At process block 230, impact levels can be determined based on potential consequences. For example, impact scores can be generated for potential outcomes at each of the components of the synchrophasor system. The impact scores can be based on the potential for the availability, integrity, and confidentiality of the synchrophasor components and/or data to be compromised. The integrity of the synchrophasor data depends on an accurate and available timing source, such as the unencrypted civilian GPS signal. For example, the PMU can acquire timing data from an internal or external GPS receiver which is synchronized to Coordinated Universal Time (UTC). A synchronization lock with the GPS-system can be indicated by the receiver. The PMU may intermittently lose a lock to the GPS signal, such as when switching satellites (the satellites are not in geosynchronous orbit). Loss of lock can be managed by operating in a holdover mode where the internal oscillator of the PMU is used. When sync is lost, the PMU may report the lost sync within a minute or so using a synchrophasor data protocol, such as the IEEE Std. C37.118 data stream. The PMU can also report that sync is regained when the time is reacquired by the receiver (it may take up to a few minutes to re-lock).

The synchrophasor data protocol can include various data quality status bits with each measurement. For example, the protocol may include data quality status bits of data valid, PMU error, sync-valid, or sort by arrival. This information can be encoded in four bits that are included in every frame of data. Generally, the bits can be encoded so that a normal state of the bit is cleared to 0, and it is set to 1 when the state is abnormal. The Data valid bit can indicate whether the data in the given PMU block is valid or invalid. Components receiving data marked as invalid may discard the data. The bit may be set to invalid by a PDC to indicate that no data was received from the data source for this particular data frame. The PMU error bit can be reserved for the PMU to indicate there is a measurement or operation problem. The PMU error bit may be defined by a vendor of the PMU. The PMU error can be used to indicate a problem with analog-to-digital conversion, a computation overflow, a memory failure, and so forth. The PMU error bit is typically not set for timing related problems. When the PMU error bit is set, the user of the data is advised to determine the cause of the indication before using the data. The sync-valid bit can indicate whether the measurement is accurately synchronized to UTC time. A PMU can set the sync-valid bit to 1 when a loss of synchronization could cause the total vector error (TVE) to exceed a limit of 1% or within 1 minute of loss of synchronization, whichever is less. The sort-by-arrival bit can indicate whether the data has been assigned a local or artificial timestamp. For example, the PDC can detect a timestamp failure in PMU data, where the received timestamp is not reasonably close to the current time. When the PDC detects the timestamp failure, the PDC can assign a time stamp locally and set the sort by arrival bit to 1 indicating that the timestamp is artificial.

Table 310 of FIG. 3 illustrates an example of potential consequences of various cyber-attacks on a synchrophasor system. The potential outcomes at each of the components of the synchrophasor system can be based on where a timing attack occurs and whether the components and data protocol provide sufficient information to detect the attack. Generally, a timing attack can be detected or undetected, and consequences of the timing attack can cause missing data, corrupted data, or holdover data (where the timestamp uses holdover time).

The location of the attack can determine the potential impact of the attack. For example, an undetected attack on the GPS signal can cause corrupt data during a spoofing attack and missing data during a jamming attack. However, if the timing attack is successfully detected and it is reflected by the data quality status bits, the PMU and/or PDC can select to either discard data (e.g., the consequence is missing data) or the PMU can operate in holdover mode (e.g., the consequence is holdover data) which may impact the accuracy of the data. A timing attack focused on changing the synchrophasor data packet after the packet has been formed may go undetected. For example, timestamp deletion or timestamp modification occurring at the PMU, network device, or PDC attack targets can lead to missing data or corrupt PMU data. Any of the timing attacks, whether detected or not, can propagate through the system and ultimately lead to the following end states (outcomes) on PMU data: corrupt data, missing data, and holdover data. Accordingly, any of the timing attacks can jeopardize the availability or integrity of the PMU measurements to some extent. Use of corrupted data from the PMU in a control and/or monitoring application, such as a fault location application, can lead to incorrect estimation of the location of the fault. For other power system applications, use of corrupted data from the PMU may lead to incorrect control or response actions which can result in disruption of operation or damage to the electrical components.

Impact scores can be assigned for each of the consequences, where more severe consequences increase the impact score. For example, a score of three can be assigned for corrupted data because corrupt data can potentially cause incorrect control actions that lead to disruption or damage of the synchrophasor component; a score of two can be assigned for missing data because a component may not be observable which can lead to sub-optimal operation of the component; and a score of one can be assigned for holdover data because data is available while this holdover time is not synchronized to the UTC.

Returning to FIG. 2, at process block 240, cyber-risk(s) of the synchrophasor system can be evaluated. For example, a risk score for each of the components and potential consequences of the synchrophasor system can be determined by using an event tree methodology. An overall risk score for the synchrophasor system can calculated using the risk score for each of the components and potential consequences. As one example, the risk score can be a vector that uses the individual scores for the potential consequences at each component as elements of the vector.

The cyber-risks of the synchrophasor system can be based on factors such as (1) the potential attack scenarios (2) triggers (e.g., initiating events or initiators, such as jamming) that cause the attack scenarios (3) likelihoods of a particular attack being attempted, (4) vulnerabilities of the components and detectability along a scenario path conditional on the attack, and (5) the business consequences of a successful attack. A risk assessment methodology can include using an event tree analysis to model alternative sequences of events that are possible for a given initiator. The different potential sequences can be categorized into different severity classes. As one example, the risk of an attack scenario can be estimated as a product of scores corresponding to: a probability of the attack, a vulnerability at the attack initiating location, detection probabilities along the scenario path, and the consequence of the attack scenario.

Using an event tree methodology for evaluating the cyber-risks of a synchrophasor system can potentially identify the locations where attacks can be initiated and account for the sequence of events for the different scenarios that lead to the final end-states of the PMU data. Challenges to applying an event tree methodology for evaluating cyber-risks of a synchrophasor system can include determining the most likely locations within the business workflow that may be exploited by a cyber-attacker and assigning attack likelihoods to the initiating locations. For example, a probability of spoofing a GPS signal (threat probability) may be highly subjective without having adequate data available to quantify it. Furthermore, even where historic data is available, a threat can be dynamic and may change over time. Similarly, probabilities of detecting abnormal data packets along the way may be subjective without access to historic data.

Figure 4A:
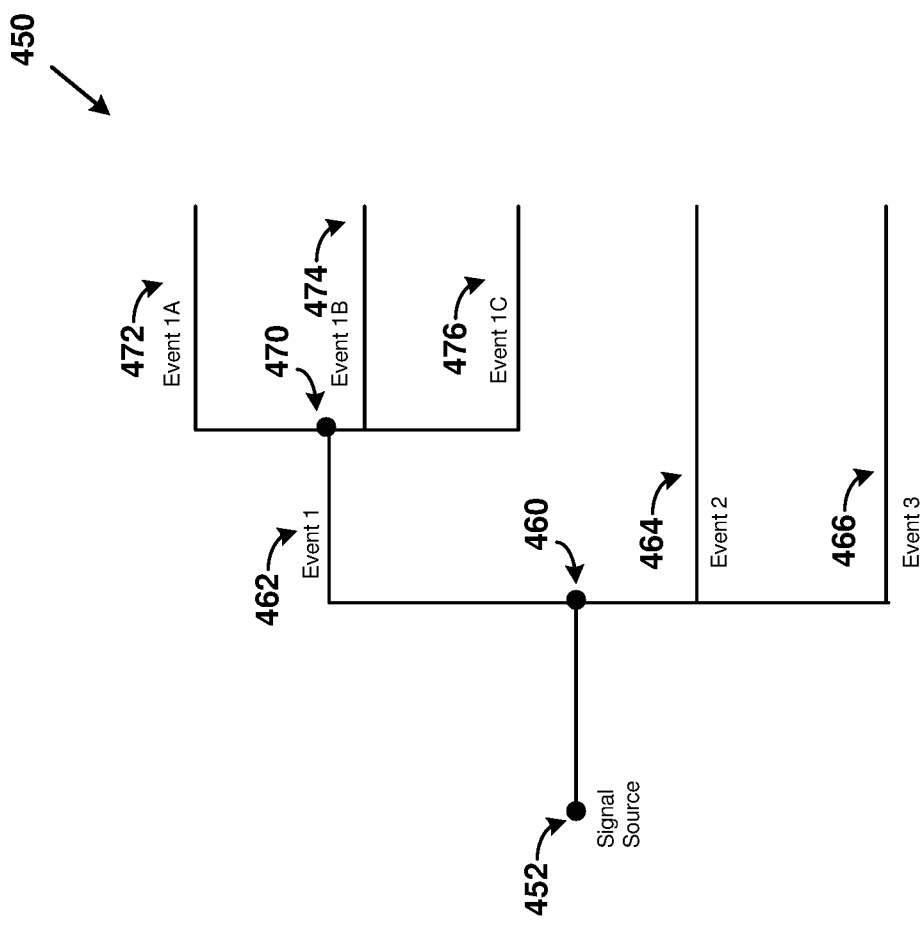
FIG. 4A illustrates an example of an event tree that can be used to model events of a system.
Figure 4B:
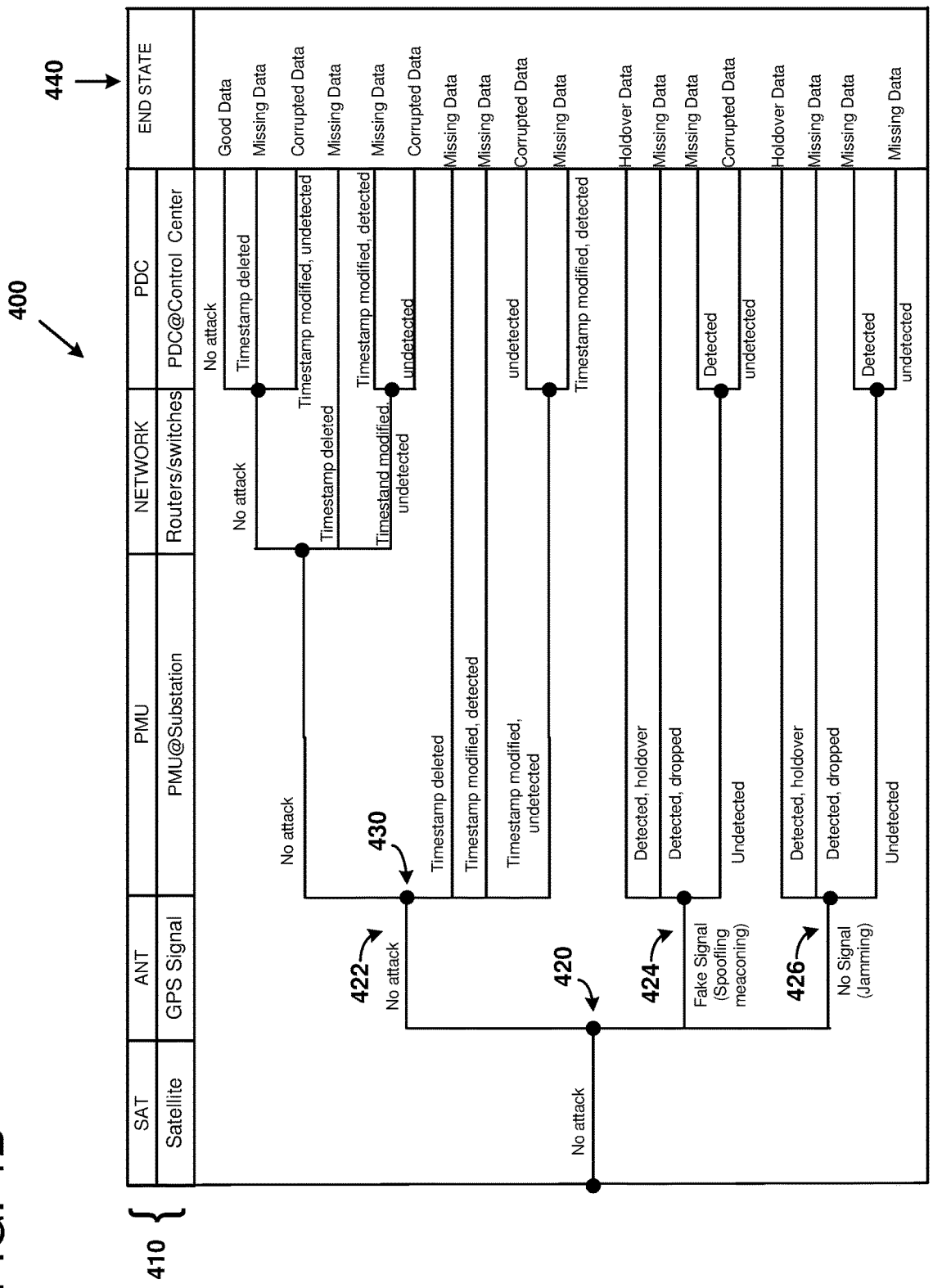
FIG. 4B illustrates an example of using an event tree to evaluate cyber-risk in a synchrophasor system.

FIGS. 4A and 4B illustrate examples of event trees that can be used to model events and/or potential outcomes within an electrical system or other type of system. An event tree is an analytical tool that enables an event to be modelled or analyzed using Boolean or other logic to examine a group of possible events and/or consequences of the events. For example, the event tree can identify a chronological series of subsequent events and/or consequences that result from the events. As one example, an event tree can be implemented as a tree, a graph, or other suitable data structure that is stored in a computer-readable memory or storage device. The event tree can be used to inductively trace forward in time or through a causal chain to model risk. Event tree analysis can be contrasted with fault tree analysis, where a fault tree can be used to evaluate risk by deductively tracing backward in time or through a causal chain of events.

FIG. 4A illustrates an example event tree 450 that can be used to model signals or information flowing through a multi-component system. A root 452 of the event tree can represent a source of the information. A node or branch-point (460 and 470) of the event tree can represent when there is more than one possible outcome, such as when the information is passed from one component to another component of the system. A respective branch (also referred to as a sub-branch) originating from a given branch-point can represent an outcome that can occur at the component represented by the branch-point. Sub-trees can include a group of connected branches and branch-points, and can represent a range of outcomes that can be generated by the system. As a specific example, a signal can be generated by a component represented by the root 452. The signal can be passed to a component represented by the branch-point 460. The sub-branches 462, 464, and 466 can represent different possible outcomes (e.g., event 1, event 2, and event 3) that can occur at the component represented by the branch-point 460. If event 1 occurs, additional events 472, 474, and 476 can occur when the signal is propagated to the component represented by the branch-point 470. As illustrated, if event 2 or event 3 occur, the outcomes are not changed by the component represented by the branch-point 470. The event tree 450 can represent five different possible outcomes (events 1A, 1B, 1C, 2, and 3) of the system.

FIG. 4B illustrates an example event tree 400 that can be used to evaluate cyber-risk in a synchrophasor system. The event tree 400 identifies attack possibilities and potential outcomes along the path from the satellite to the PDC at the control center. The labels 410 indicate the sections of the event tree corresponding to a particular component of the synchrophasor system. The event tree 400 can include one or more branch-points (such as branch-points 420 and 430) for each component in the path through the synchrophasor system. The event tree 400 can include one or more sub-branches (such as branches 422, 424, and 426) for different possibilities that can occur at each component in the path through the synchrophasor system. As a specific example, sub-branch 422 indicates the possibility that no attack occurs at the antenna (e.g., the GPS signal is not being attached); sub-branch 424 indicates the possibility that a spoofing or meaconing attack is occurring at the antenna; and sub-branch 426 indicates the possibility that a jamming attack is occurring at the antenna (e.g., the GPS signal is being blocked). The events represented by the branch-points and sub-branches can be propagated through the event tree indicating the different possibilities that can occur along a path through the synchrophasor system. The end states 440 at the PMU indicate the potential states of the data (e.g., good data, missing data, holdover data, or corrupted data) as it passes from the PMU to a control and/or monitoring application.

Each sub-branch can be assigned a probability based on the likelihood of occurrence and/or likelihood of a component detecting an abnormality in the data. For example, the probability of detecting a modified GPS signal can be a function of the GPS receiver, and the probability of detecting a modified timestamp can be a function of the PMU or PDC. Each sub-branch starting with an initiating event can be a root for a subtree independent of other attack scenarios. Risk scores can be assigned for each branch, where the risk scores can have dimensions or can be dimensionless. For example, a threat likelihood can be considered as a frequency of events observed per year.

The probabilities of the sub-branches can be combined with the impact scores and the vulnerability scores to generate a cyber-risk score for the different possibilities of each of the components. Table 320 of FIG. 3 illustrates an example of risk scores of various cyber-attacks of a synchrophasor system.

Returning to FIG. 2, at process block 250, an action can be performed in response to the cyber-risk and/or real-time conditions. For example, the cyber-risk evaluation can identify synchrophasor components that may be vulnerable to a cyber-attack. During a design and/or upgrade cycle, the potentially vulnerable components can be upgraded to make them less susceptible to cyber-attacks. During an operational phase, the cyber-risk can be combined with real-time conditions to determine whether a cyber-attack is probably occurring. For example, a series of detected modified and/or deleted time-stamps, or a series of holdover data within a given amount of time may indicate that a cyber-attack is underway. When a cyber-attack is suspected, the synchrophasor system can be adapted to respond to the cyber-attack or to protect one or more components of the synchrophasor system. For example, a probable source of the cyber-attack can be identified, and the probable source can be reconfigured to potentially stop the cyber-attack. An operating parameter of a component of the synchrophasor system can be changed in response to a potential cyber-attack. In one example, a vulnerable component (such as an electrical component in a sub-station) can be logically or physically removed from the synchrophasor system. By removing (also referred to as isolating or quarantining) the component, an impact of a cyber-attack may be reduced or limited to fewer components than the entire synchrophasor system. In other words, removing the component can potentially prevent adverse effects of a timing attack from spreading to other components of the system. Removing the component can also potentially reduce an amount of damage that could occur to more costly components within the synchrophasor system.

Figure 5:
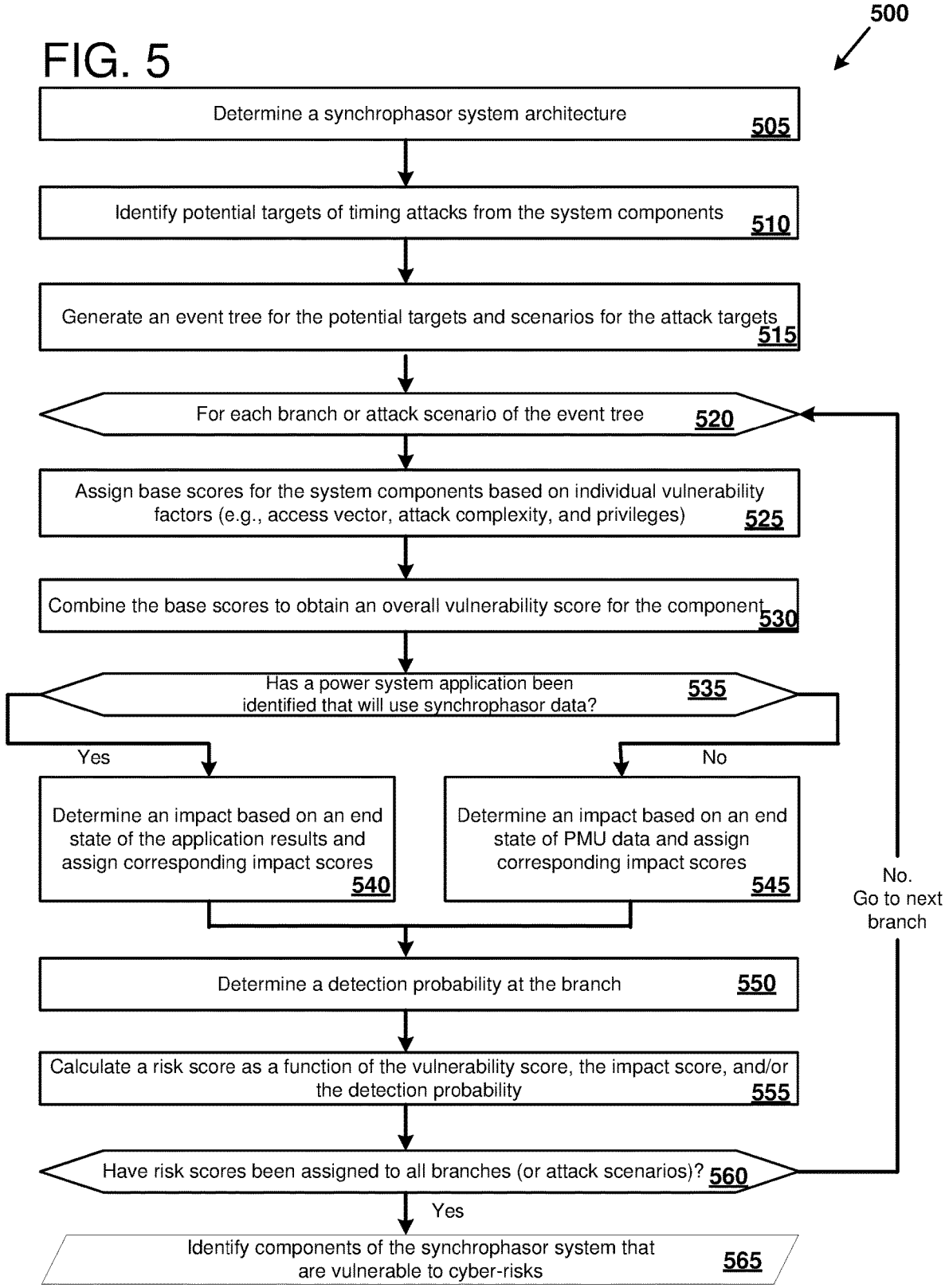
FIG. 5 is a flow diagram of an example method of evaluating cyber-risk in a synchrophasor system.

FIG. 5 is a flow diagram of an example method 500 of evaluating cyber-risk in a synchrophasor system. As one example, the method 500 can be performed using a synchrophasor system as described above in FIG. 1.

At process block 505, a synchrophasor system architecture can be determined. The architecture can include hardware and software components and the pathways between the various components. Timing source(s) of the system can be identified, and pathways from the timing source(s) to final destinations (e.g., a PMU or a control and/or monitoring application sourced by a PMU).

At process block 510, potential targets of timing attacks can be identified from the system components. For example, timing attacks can occur by jamming, spoofing, or meaconing a GPS signal; interrupting or spoofing a timing source other than a GPS signal; deleting or modifying a time stamp of a synchrophasor data packet; and so forth. Additionally, a threat probability can be determined for each potential target and/or attack scenario.

At process block 515, an event tree can be generated for the potential targets and scenarios for the attack targets. For example, branches of the event tree can represent scenarios where the initiating locations (selected from the list of the attack targets) are different and the detection outcomes are different.

At process blocks 520-560, a loop can be performed for each of the different tree branches or attack scenarios. At process block 520, the loop can begin.

At process block 525, base scores can be assigned for the system components based on the individual vulnerability factors. For example, the vulnerability factors can include an access vector, an attack complexity, and/or privileges probably required for a successful attack. At process block 530, the base scores can be combined to obtain an overall vulnerability score for the component. The base scores can be combined in a variety of ways. As one example, an average of the base scores can be used for the overall vulnerability score. As another example, a weighted average (where some base scores are weighted more heavily than other base scores) can be used for the overall vulnerability score.

At process block 535, it can be determined whether a power system application has been identified that will use synchrophasor data. If the power system application has been identified, then at process block 540, an impact on the application can be determined based on an end state of the application results (e.g., biased results, missing results, and so forth). A corresponding impact score can be assigned based on the end state of the application results. If the power system application has not been identified, then at process block 550, an impact can be determined based on an end-state of the PMU data (e.g., corrupted data, missing data, and/or holdover data). A corresponding impact score can be assigned based on the end state of the PMU data.

At process block 550, a detection probability at the branch can be determined. The probability of detecting a timing attack can be affected by the component where the timing attack occurs and by downstream components in the path of and including the PMU and/or a control and monitoring application.

At process block 555, a risk score can be calculated as a function of the threat probability, the vulnerability score, the impact score, and/or the detection probability. As one example, the risk score can be the product of the vulnerability score, the impact score, and the detection probability. As another example, the risk score can be the product of the threat probability, the vulnerability score, the impact score, and the detection probability.

At process block 560, it can be determined whether all branches and/or attack scenarios have been processed. If there are more branches and/or attack scenarios to be processed, the method 500 can continue at process block 520. If all branches and/or attack scenarios have been processed, the method 500 can continue at process block 565.

Figure 6:
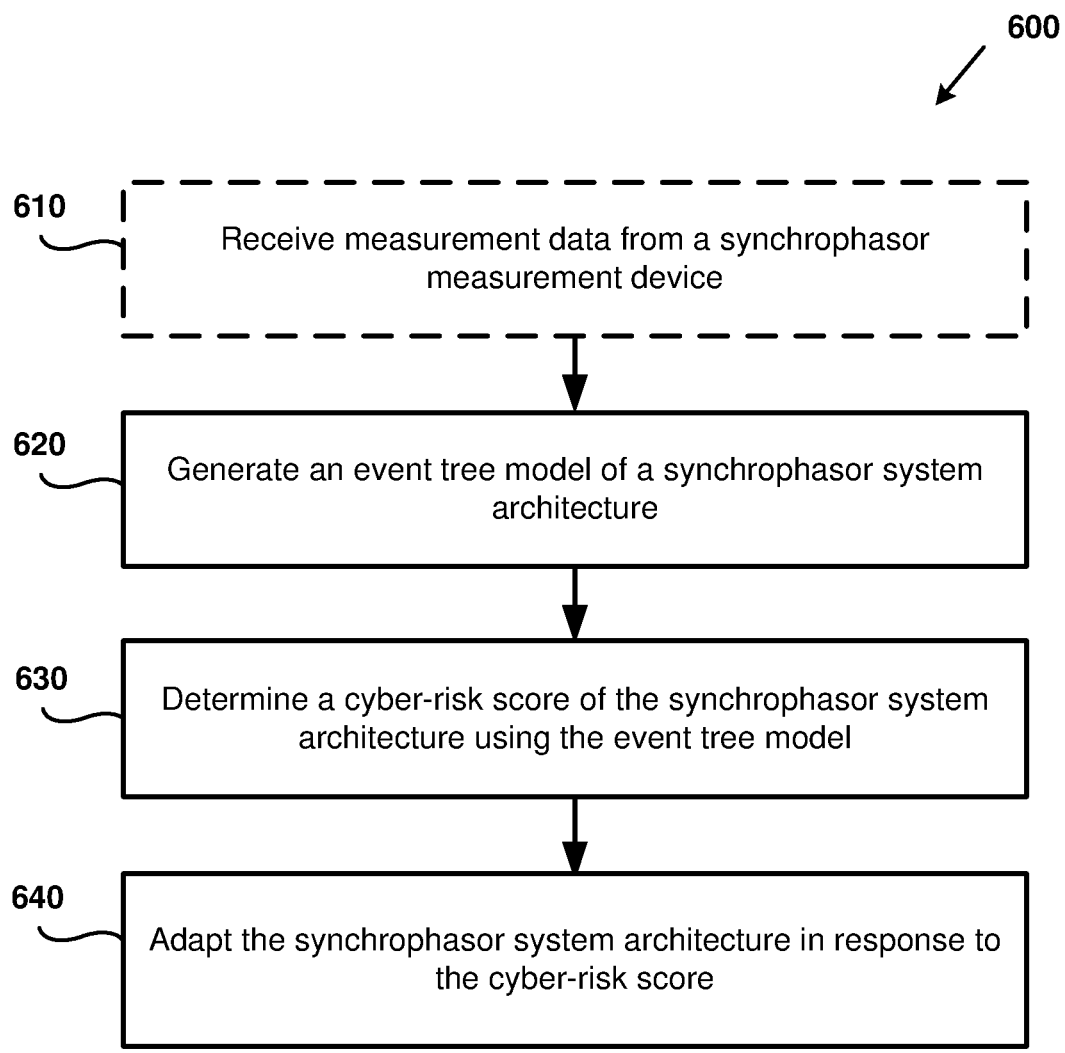
FIG. 6 is a flow diagram of an example method of adapting a synchrophasor system architecture in response to a cyber-risk.

At process block 565, components of the synchrophasor system that are vulnerable to cyber-risks can be identified. For example, the components having the highest risk scores can be identified as the most vulnerable to cyber-risks. As a specific example, a threshold number of components can be identified, or the components exceeding a threshold risk scores can be identified as the most vulnerable FIG. 6 is a flow diagram of an example method 600 of adapting a synchrophasor system architecture in response to a cyber-risk. As one example, the method 600 can be performed using a synchrophasor system as described above in FIG. 1.

At optional process block 610, measurement data can be received from a synchrophasor measurement device. For example, the synchrophasor measurement device can be a PMU. The measurement data can be synchrophasor data, where the measurement data includes a measurement of an electrical quantity and a synchronized timestamp. As one example, the synchronized timestamp can be generated based on UTC obtained from a GPS signal.

At process block 620, an event tree model of a synchrophasor system architecture can be generated. The event tree model can be based on locations and types of timing-attacks, an attack likelihood, vulnerabilities and detectability along a scenario path, and/or consequences of the timing-attack. The event tree model can include a branch-point for a respective component of the synchrophasor system and sub-branches from the branch-point for different respective consequences of a timing attack at the respective component. For example, one of the consequences of the timing attack can be a modified timestamp being generated at the respective component. Another consequence of the timing attack can be a deleted timestamp.

At process block 630, a cyber-risk score of the synchrophasor system architecture can be determined using the event tree model. For example, the cyber-risk score can be based on vulnerability scores for respective components of the synchrophasor system. A vulnerability score for a respective component can be based on a physical accessibility of the respective component, an attack complexity for exploiting the respective component, and/or a privilege level for accessing the respective component. The cyber-risk score of the synchrophasor system architecture can be based on a function that uses the vulnerability scores for the respective components as inputs. The cyber-risk score of the synchrophasor system architecture can be a vector having elements corresponding to different components of the synchrophasor system architecture.

At process block 640, the synchrophasor system architecture can be adapted in response to the cyber-risk score. For example, the synchrophasor system architecture can be adapted in real-time operation of the synchrophasor system in response to the cyber-risk score and the measurement from the synchrophasor measurement device. Adapting the synchrophasor system architecture can include logically and/or physically removing a vulnerable component from the synchrophasor system architecture when a cyber-risk is detected. Adapting the synchrophasor system architecture can include upgrading a vulnerable component of the synchrophasor system architecture to be more robust to a cyber-risk when a cyber-risk is detected.

Figure 7:
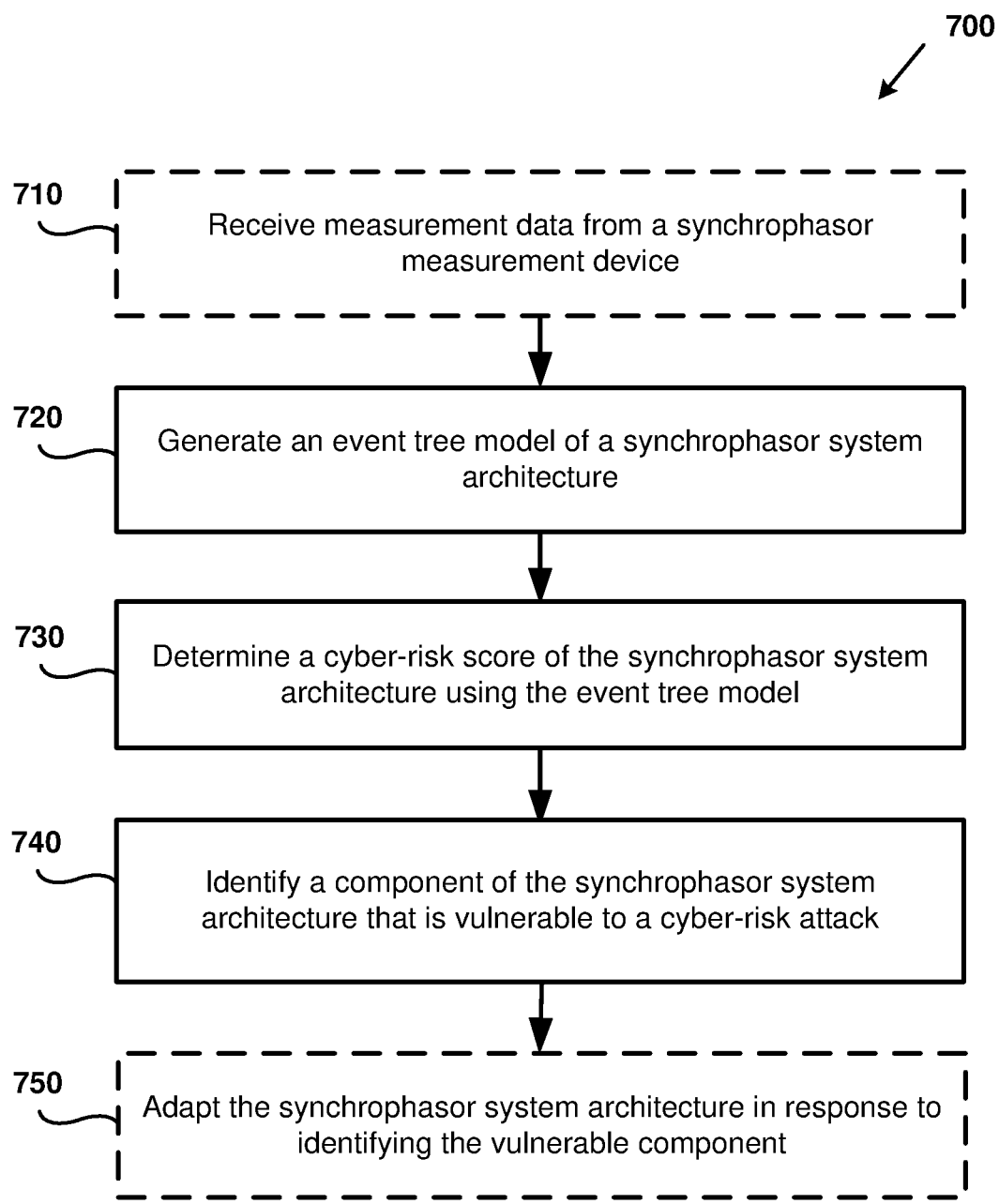
FIG. 7 is a flow diagram of an example method of identifying a component of a synchrophasor system architecture that is vulnerable to a cyber-risk attack.

FIG. 7 is a flow diagram of an example method 700 of identifying a component of a synchrophasor system architecture that is vulnerable to a cyber-risk attack. As one example, the method 700 can be performed using a synchrophasor system as described above in FIG. 1.

At optional process block 710, measurement data can be received from a synchrophasor measurement device. For example, the synchrophasor measurement device can be a PMU. The measurement data can be synchrophasor data, where the measurement data includes a measurement of an electrical quantity and a synchronized timestamp. As one example, the synchronized timestamp can be generated based on UTC obtained from a GPS signal.

At process block 720, the event tree model can include a branch-point for a respective component of the synchrophasor system and sub-branches from the branch-point for different respective consequences of a timing attack at the respective component. For example, one of the consequences of the timing attack can be a modified timestamp being generated at the respective component. Another consequence of the timing attack can be a deleted timestamp.

At process block 730, a cyber-risk score of the synchrophasor system architecture can be determined using the event tree model. For example, the cyber-risk score can be based on vulnerability scores for respective components of the synchrophasor system. A vulnerability score for a respective component can be based on a physical accessibility of the respective component, an attack complexity for exploiting the respective component, and/or a privilege level for accessing the respective component. The cyber-risk score of the synchrophasor system architecture can be based on a function that uses the vulnerability scores for the respective components as inputs. The cyber-risk score of the synchrophasor system architecture can be a vector having elements corresponding to different components of the synchrophasor system architecture.

At process block 740, a component of the synchrophasor system architecture can be identified that is vulnerable to a cyber-risk attack. For example, the component of the synchrophasor system architecture can be identified as vulnerable to cyber attack when the vulnerability score of the component is greater than a threshold value.

At optional process block 750, the synchrophasor system architecture can be adapted in response to identifying the vulnerable component. For example, the synchrophasor system architecture can be adapted in real-time operation of the synchrophasor system in response to identifying the vulnerable component. As another example, the synchrophasor system architecture can be adapted in real-time operation of the synchrophasor system in response to identifying the vulnerable component and a measurement from the synchrophasor measurement device. Adapting the synchrophasor system architecture can include logically and/or physically removing the vulnerable component from the synchrophasor system. Adapting the synchrophasor system architecture can include upgrading the vulnerable component of the synchrophasor system architecture.

Example Computing Environment

Figure 8:
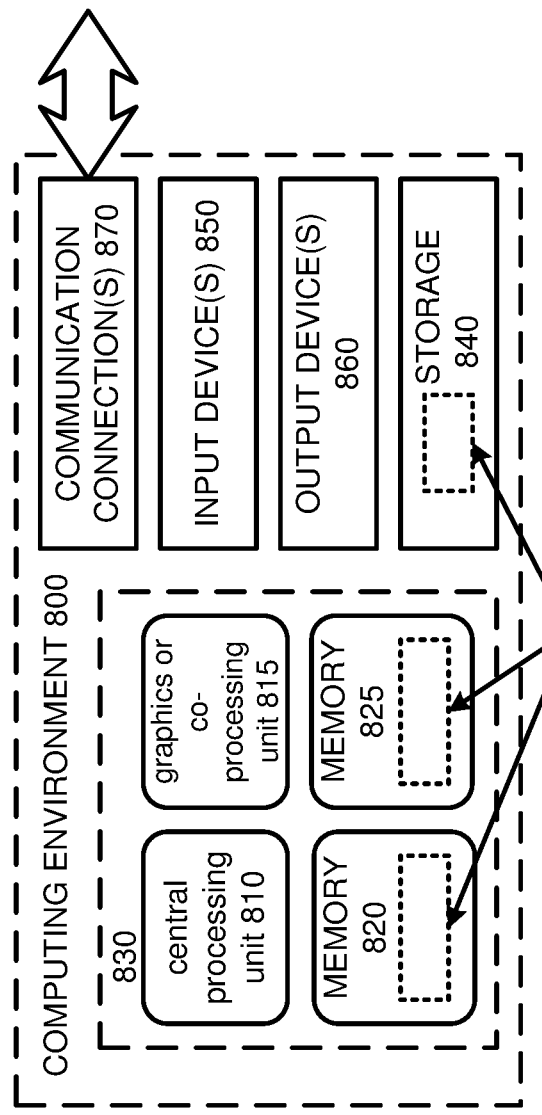
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. As used herein, "computer-readable media" are any available media that can be accessed within the computing environment 800. By way of example, and not limitation, with the computing environment 800, computer-readable media include memory 820 and/or storage 840. As should be readily understood, the term computer-readable storage media includes the media for data storage such as memory 820 and storage 840, and not transmission media such as modulated data signals.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood to one of ordinary skill in the relevant art having the benefit of the present disclosure that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood to one of ordinary skill in the relevant art having the benefit of the present disclosure that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples and should not be taken as limiting the scope of the claimed subject matter. We claim as our invention all that comes within the scope of these claims.

What is claimed is:
1. A synchrophasor system comprising:
a synchrophasor measurement device; and
a processor in communication with the synchrophasor measurement device, the processor being configured to:
receive measurement data from the synchrophasor measurement device, produce an event tree model of a timing attack on the synchrophasor system, the event tree model describing a chronological series of events subsequent to a triggering event, assign a sub-branch of the event tree model a nonbinary value indicating a likelihood of a component in the synchrophasor system detecting an abnormality in the measurement data, determine a cyber-risk score of the synchrophasor system using the event tree model and the received measurement data, and change an operating parameter of a component of the synchrophasor system based on the cyber-risk score.

2. The system of claim 1, wherein the measurement data comprises a synchronized timestamp.

3. The system of claim 2, wherein determining the cyber-risk score of the synchrophasor system comprises determining whether the synchronized timestamp of the measurement data is missing.

4. The system of claim 2, wherein determining the cyber-risk score of the synchrophasor system comprises determining whether the synchronized timestamp of the measurement data is modified.

5. The system of claim 1, wherein the synchrophasor measurement device comprises a phasor measurement unit.

6. The system of claim 1, wherein determining the cyber-risk score of the synchrophasor system comprises determining a vulnerability score for a respective component of the synchrophasor system.

7. The system of claim 6, wherein the vulnerability score for the respective component of the synchrophasor system is based on physical accessibility of the respective component, an attack complexity for exploiting the respective component, and a privilege level for accessing the respective component.

8. The system of claim 1, wherein changing the operating parameter of the component of the synchrophasor system comprises removing the component from the synchrophasor system.

9. The synchrophasor system of claim 1, wherein a sub-branch of the event tree model is assigned a probability based on a likelihood of occurrence of the event and/or a likelihood of a component in the synchrophasor system detecting an abnormality in the measurement data.

10. The synchrophasor system of claim 1, wherein the event tree model further indicates one or more consequences that result from the chronological series of events.

11. A method comprising:
generating an event tree model of a timing attack on a synchrophasor system architecture, the event tree model describing a chronological series of events subsequent to a triggering event;
assigning a sub-branch of the event tree model a nonbinary value indicating a likelihood of a component in the synchrophasor system architecture detecting an abnormality;
determining a cyber-risk score of the synchrophasor system architecture using the event tree model, wherein the cyber-risk score is an overall cyber-risk score determined from individual cyber-risk scores determined for respective elements in the synchrophasor system architecture; and
adapting the synchrophasor system architecture in response to the cyber-risk score.

12. The method of claim 11, wherein generating the event tree model comprises generating a branch-point of the event tree model for a respective component of the synchrophasor system and sub-branches from the branch-point for different respective consequences of a timing attack at the respective component.

13. The method of claim 12, wherein one of the respective consequences of the timing attack is a modified timestamp being generated at the respective component.

14. The method of claim 11, wherein determining the cyber-risk score of the synchrophasor system architecture using the event tree model comprises determining a vulnerability score for a respective component of the synchrophasor system and identifying the respective component as being vulnerable because its vulnerability score exceeds a threshold value.

15. The method of claim 14, wherein the vulnerability score for the respective component of the synchrophasor system is based on a physical accessibility of the respective component.

16. The method of claim 11, wherein adapting the synchrophasor system architecture in response to the cyber-risk score includes removing a vulnerable component from the synchrophasor system architecture when a cyber-risk is detected.

17. The method of claim 11, wherein the synchrophasor system architecture is adapted in real-time operation of the synchrophasor system in response to the cyber-risk score and a measurement of the synchrophasor system.

18. The method of claim 11, wherein the individual cyber-risk scores vary based on a location determined for an attacker on the synchrophasor system architecture.

19. The method of claim 11, wherein the individual cyber-risk scores vary based on a severity of consequences resulting from an attack on the respective elements in the synchrophasor system architecture.

20. The method of claim 11, further comprising assigning a sub-branch of the event tree model a nonbinary value indicating a likelihood of a component in the synchrophasor system detecting an abnormality in the measurement data.

21. A computer-readable storage medium including instructions that upon execution cause a computer system to:
generate an event tree model of a timing-attack on a synchrophasor system architecture, at least one sub-branch of the event tree model comprising a nonbinary value indicating a likelihood of a component in the synchrophasor system architecture detecting an abnormality in the measurement data;
determine a cyber-risk score of the synchrophasor system architecture using the event tree model, wherein the cyber-risk score is based at least in part on resources needed by an attacker to exploit a respective vulnerability in the synchrophasor system architecture, the resources on which the cyber-score is at least partially based including cybersecurity privileges; and
identify a component of the synchrophasor system architecture as being vulnerable to a cyber attack.

22. The computer-readable storage medium of claim 21, wherein generating the event tree model comprises generating a branch-point of the event tree model for a respective component of the synchrophasor system and sub-branches from the branch-point for different respective consequences of a timing attack at the respective component.

23. The computer-readable storage medium of claim 21, wherein the cyber-risk score of the synchrophasor system architecture is a vector having elements corresponding to different components of the synchrophasor system architecture.

24. The computer-readable storage medium of claim 21, wherein the synchrophasor system architecture produces data that includes data status bits for one or more measurements of elements in the synchrophasor system architecture, the data status bits including a dedicated error bit indicative of an error occurring during collection of the data.

25. The computer-readable storage medium of claim 21, wherein the event tree model describing a chronological series of events subsequent to a triggering event.

* * * * *

UNITED STATES PATENT AND TRADEMARK OFFICE
CERTIFICATE OF CORRECTION

PATENT NO. : 11,206,287 B2  
APPLICATION NO. : 16/261283  
DATED : December 21, 2021  
INVENTOR(S) : Pal et al.

Page 1 of 1

It is certified that error appears in the above-identified patent and that said Letters Patent is hereby corrected as shown below:

In the Claims

Column 21,  
Line 6, "tree model describing" should be --tree model describes--

Signed and Sealed this  
Tenth Day of October, 2023

Katherine Kelly Vidal  
*Director of the United States Patent and Trademark Office*